(12) United States Patent
Lewites

(10) Patent No.: US 7,752,635 B2
(45) Date of Patent: Jul. 6, 2010

(54) SYSTEM AND METHOD FOR CONFIGURING A VIRTUAL NETWORK INTERFACE CARD

(75) Inventor: Saul Lewites, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 10/740,908

(22) Filed: Dec. 18, 2003

(65) Prior Publication Data

US 2005/0138620 A1    Jun. 23, 2005

(51) Int. Cl.
G06F 13/00 (2006.01)
G06F 9/45 (2006.01)
G06F 9/445 (2006.01)

(52) U.S. Cl. .................. 719/327; 717/148; 718/1

(58) Field of Classification Search ......... 370/254–258; 709/220–222, 238–244; 718/1; 710/47, 710/48, 311–316; 717/148; 719/327
See application file for complete search history.

(56) References Cited

U.S. PATENT DOCUMENTS

| | | | |
|---|---|---|---|
| 5,541,853 A * | 7/1996 | Croft | 709/212 |
| 5,872,956 A | 2/1999 | Beal et al. | |
| 6,473,726 B1 | 10/2002 | Reblewski | |
| 6,496,847 B1 | 12/2002 | Bugnion et al. | |
| 7,111,303 B2 * | 9/2006 | Macchiano et al. | 719/313 |
| 7,260,820 B1 * | 8/2007 | Waldspurger et al. | 718/1 |
| 7,424,710 B1 * | 9/2008 | Nelson et al. | 718/1 |
| 2002/0118644 A1 * | 8/2002 | Moir | 370/230.1 |
| 2002/0143842 A1 * | 10/2002 | Cota-Robles et al. | 709/1 |
| 2002/0143960 A1 * | 10/2002 | Goren et al. | 709/229 |
| 2003/0120818 A1 * | 6/2003 | Ho | 709/250 |
| 2004/0221298 A1 * | 11/2004 | Cedola | 719/321 |
| 2004/0267866 A1 * | 12/2004 | Carollo et al. | 709/200 |
| 2005/0066086 A1 * | 3/2005 | Ramanathan | 710/63 |
| 2005/0076324 A1 * | 4/2005 | Lowell et al. | 717/100 |

FOREIGN PATENT DOCUMENTS

| | | |
|---|---|---|
| JP | 02-51172 | 2/1990 |
| JP | 2002-189389 | 7/2002 |
| JP | 2003-500716 | 1/2003 |
| JP | 2004-501534 | 1/2004 |
| WO | WO 01/24065 | 4/2001 |

(Continued)

OTHER PUBLICATIONS

Barham, P., et al., "Xen and the Art of Virtualization", *SOSP '03: Proc of the 19$^{th}$ ACM Symp on Operating Systems Principles 2003*, 37(5):164-177, Oct. 2003.

(Continued)

*Primary Examiner*—Hyung S Sough
*Assistant Examiner*—Charles E Anya
(74) *Attorney, Agent, or Firm*—Blakely, Sokoloff, Taylor & Zafman LLP

(57) ABSTRACT

A system includes an interface device that executes a driver and a processing device that executes instructions to implement a virtual machine, and to implement a virtual network interface card that is configurable to enable communication between the driver and the virtual machine. The processor executes instructions to configure the virtual network interface card.

20 Claims, 3 Drawing Sheets

FOREIGN PATENT DOCUMENTS

WO      WO 01-80488      10/2001

OTHER PUBLICATIONS

Fraser, K., et al., "Safe Hardware Access with the Xen Virtual Machine Monitor", *Proc. of the 1st Workshop on Operating System and Architectural Support for the on Demand IT Infrastructure* [*Online*], URL: http://www.cl.cam.ac.uk/Research/SRG/netos/papers/2004-safehw-oasis.pdf (retrieved on Mar. 6, 2006), pp. 1-7, Oct. 2004.

Sugerman, J., et al., "Virtualizing I/O Devices on VMware Workstation's Hosted Virtual Machine Monitor", *Proc of the USENIX Annual Technical Conf.*, pp. 1-14, Jun. 2001.

Anonymous, "Computer Science Technical Reports", [Online] May 2007, Purdue University, West Layfayette, IN, USA. Retrieved from the internet: http://www.cs.purdue.edu/research/technical_reports/ on May 10, 2007.

Jiang, X., et al., "VIOLIN: Virtual Internetworking on Overlay Infrastructure", CSD TR#03-027, [Online] Jul. 2003, pp. 1-6, Purdue University West Layfayette, IN, USA. Retrieved from the internet: http://www.cs.purdue.edu/research/_technical_reports/2003/TR%2003-027.pdf on May 10, 2007.

European Communication mailed Jul. 26, 2007 for application No. 04812616.3-2211.

Examination Report dated Jun. 19, 2008, issued in corresponding European Application Serial No. 04812616.3.

Top Management Service, "VMware Workstation 3.0 Official Introduction Guidebook, First Version" Locus Co., Jan. 25, 2002, p. 1-207 (No translation available.).

Office Action, issued Nov. 11, 2008, in corresponding Japan Applicatiion No. 2006-543876 (English translation only).

Office Action, issued Dec. 26, 2008, in corresponding China Application Serial No. 200480036846.5 (with English translation).

Office Action, dated Jun. 9, 2009, issued in corresponding Japan Application No. 2006-543876 (English translation only).

European Examination Report, dated Sep. 21, 2006, issued in European Application No. 04812616.3.

International Preliminary Report on Patentability, date Jun. 20, 2006, issued in Application No. PCT/US2004/040144.

Office Action, dated Oct. 9, 2009, issued in corresponding China Application No. 200480036846.5, and suggestions for response to the Office Action.

Proposed claim amendments to Chinese counterpart application in response to Office Action, dated Oct. 9, 2009, issued in corresponding China Application No. 200480036845.5 (Dec. 2009).

\* cited by examiner

SYSTEM AND METHOD FOR CONFIGURING A VIRTUAL NETWORK INTERFACE CARD

TECHNICAL FIELD

This invention relates to configuring a virtual network interface card (VNIC).

BACKGROUND

A virtual machine (VM) is a self-contained operating environment that emulates a hardware platform and can run a "guest" operating system. A VM runs "on top" of a virtual machine monitor (VMM), which is an operating system that is run on the underlying hardware platform. The VMM contains multiple virtual devices, one of which can be a virtual network interface card (VNIC).

The VNIC runs as part of the VMM and routes data packets between a network interface card (NIC) on the hardware platform and various VMs.

DESCRIPTION OF THE DRAWINGS

Like reference numerals in different figures indicate like elements.

DESCRIPTION

Figure 1:
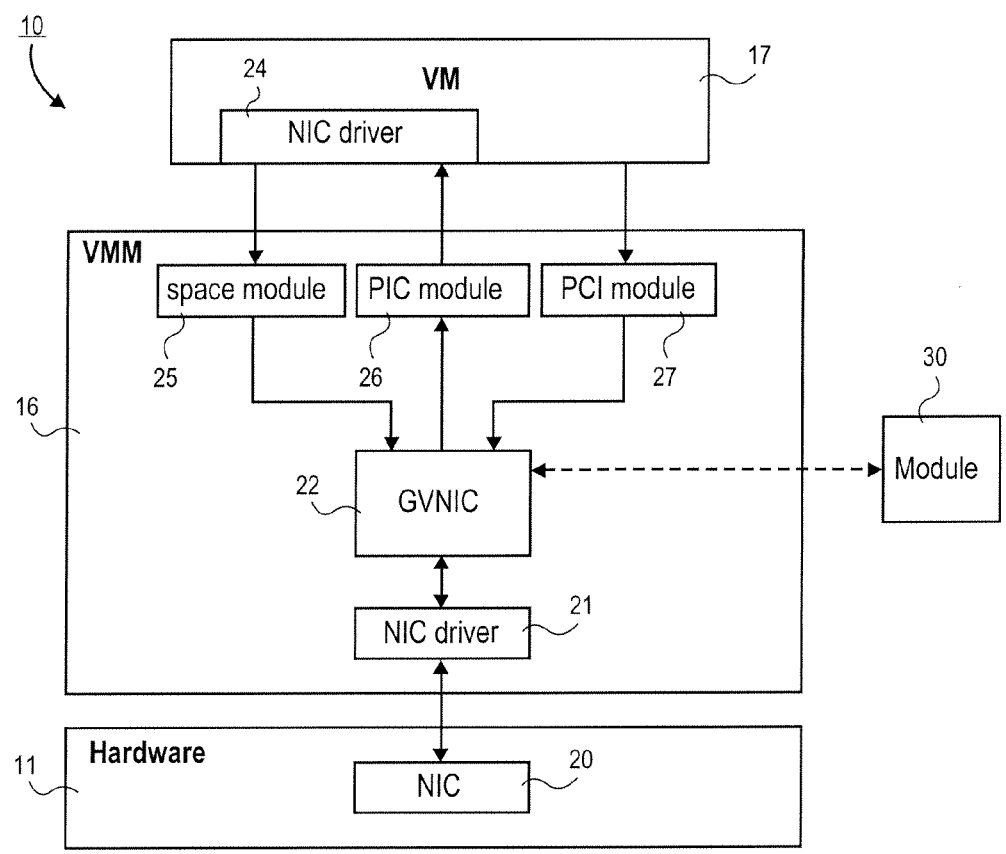
FIG. 1 is a block diagram of a system for implementing VMs on a hardware platform.

FIG. 1 shows the architecture of a system 10 that is capable of running one or more VMs. System 10 includes a hardware platform 11, such as that shown in FIG. 2.

Hardware platform 11 may be a personal computer, a server, a mainframe computer, or any other type of computing device. Hardware platform 11 includes a processing device 12, such as a microprocessor or controller, and one or more memory device(s) 14. Memory device(s) 14 store machine-executable instructions 15 that are executed by processing device 12 to implement VMM 16 and VM 17 (FIG. 1). Additional VMMs and VMs may also be implemented within system 10.

Each VM comprises a "shell" in which a "guest" operating system is run. The guest operating systems are unaware that they are running on top of VMM 16. VMM 16 makes it possible for the guest operating systems to operate as if they were running on hardware. The manner in which VMM 16 does this is described below.

NIC 20 is an expansion board that is installed in hardware platform 11 and that enables hardware platform 11 to connect to a network. NIC 20 may be any type of network interface card. For example, NIC 20 may be an Ethernet NIC, which supports Ethernet connections, or a 10/100/1000 NIC that supports both Ethernet and higher-performance Fast Ethernet connections. NIC 20 may also support wireless networking. Wireless networking uses radio frequency (RF) technology to transmit a signal through air, instead of over a wire. Such a NIC performs substantially the same functions as a NIC in a wired environment, including preparing data for transmissions over a medium and receiving data from the medium.

Processing device 12 executes a NIC driver 21 that enables NIC 20 to exchange communications with VMM 16. NIC driver 21 acts as a mediator between NIC 20 and software that interacts with NIC 20. Specifically, NIC driver 21 acts as a high-level interface for software modules running on NIC 20.

VMM 16 includes generic virtual NIC (GVNIC) 22. GVNIC 22 is configurable to route data packets between NIC 20 and various VMs (e.g., VM 17). GVNIC 22 interfaces to NIC driver 21 via a high-level application programming interface (API).

GVNIC 22 is "generic" in the sense that it contains core functionality needed to use the API exposed by NIC driver 21 and to support a NIC driver 24 run on the guest operating system of VM 17. This core functionality comprises a set of common tasks, which include, but are not limited to, claiming a region in configuration space to allow the guest operating system access to the GVNIC's peripheral component interconnect (PCI) header; claiming a region in memory and/or input/output (I/O) space to allow NIC driver 24 to access the GVNIC's control and status registers (CSRs); injecting interrupts into VM 17; transmitting and receiving data frames; handling callbacks from NIC driver 21, e.g., completion of transmit requests, reception of frames, and diagnostics; and programming receiver side filters for, e.g., multicasting and broadcasting. GVNIC 22 is programmed to emulate hardware that performs these functions, as described below.

VMM 16 also includes virtual space module 25, virtual programmable interrupt control (PIC) module 26, and virtual PCI module 27. Virtual space module 25 routes memory accesses from VM 17 to GVNIC 22. For example, virtual space module 25 directs all memory accesses within a specified range previously claimed, such as 00-FF, to GVNIC 22 or to other virtual devices. Virtual PIC module 26 routes interrupts to VM 17. Virtual PCI module 27 enables discovery and programming of GVNIC 22 by the guest operating systems.

More specifically, virtual PCI module 27 scans the virtual PCI bus associated with VMM 16 and informs the guest operating system running on VM 17 of the identity of devices on the virtual PCI bus, such as GVNIC 22. The identity may include the type of the device, a device identifier (ID), and/or a manufacturer/vendor ID. The guest operating system configures identified devices to work with the guest operating system. This configuring includes, but is not limited to, assigning, in each device and for the guest operating system, memory address space and an input/output (I/O) address range. After each device, such as GVNIC 22, is programmed, the device informs virtual space module 25, which routes communications (e.g., data packets) between the guest operating system and GVNIC 22 accordingly.

Figure 3:
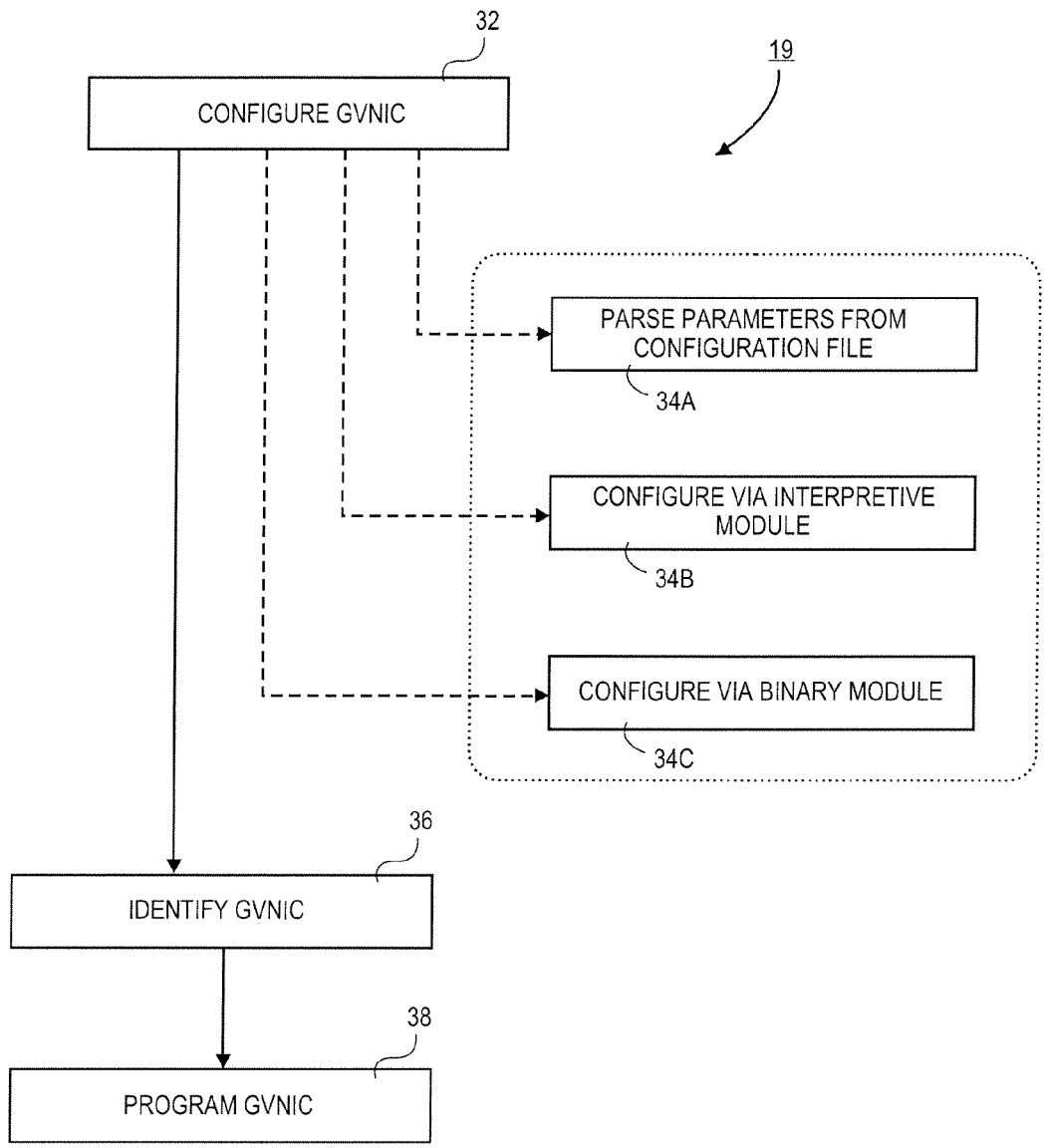
FIG. 3 is a flowchart of a process for configuring a VNIC in the system of FIG. 1.

FIG. 3 shows a process 19 for configuring GVNIC 22. Process 19 configures (32) GVNIC 22 prior to programming. Configuration of GVNIC 22 may be effected in different ways. In one embodiment, GVNIC 22 is configured using a configuration file. The configuration file may be stored in association with GVNIC 22 beforehand or the configuration file may be obtained from an external source. The configuration file contains configuration information (described below) that is used to configure GVNIC 22 so that GVNIC 22 can emulate a NIC that provides an interface to NIC driver 21 and to NIC driver 24 run on the guest operating system of VM 17.

The configuration information may include data specifying the contents of PCI registers that are unique to the hardware being emulated by GVNIC 22, the method of implementing direct memory accesses (DMA) performed by the hardware being emulated by GVNIC 22, and the configuration of data structures for use in transmitting data between NIC driver 21 and VM 17. Other types of configuration information may be included as well.

In one embodiment, the configuration file is an eXtensible Markup Language (XML) file that stores the configuration information as parameters (or "tags") in various fields. GVNIC 22 parses (34a) the XML file to obtain the parameters and uses the parameters to configure itself accordingly. Configuration files other than XML may be used.

Instead of configuring GVNIC 22 by parsing a configuration file, GVNIC 22 may be configured to "call" (i.e., reference) a separate module 30. Specifically, in response to identifying the hardware device, GVNIC 22 retrieves instructions to call module 30. The instructions may be retrieved from an internal or external database. Module 30 may be called once or as required, depending on the requirements of the hardware being emulated.

Instead of calling module 30, module 30 may be loaded into, and run from, GVNIC 22 in order to configure GVNIC 22.

Module 30 is used to implement functionality that is specific to the hardware being emulated by GVNIC 22. For example, module 30 may provide data specifying the contents of PCI registers that are unique to the hardware being emulated by GVNIC 22, may implement direct memory accesses (DMA) performed by the hardware being emulated by GVNIC 22, and may configure data for transmission between NIC driver 21 and VM 17. In this regard, GVNIC 22 may also provide module 30 with data that is being transferred between NIC driver 21 and VM 17. This data may be processed and/or formatted by module 30 and then sent back to GVNIC 22 for transfer.

Module 30 may be an interpretive module (34b) or a compiled module (34c). An interpretive module is written in an interpretive language, such as $C^{++}$. Code in the interpretive module needs to be complied in order to configure GVNIC 22. Different types of code may be required for different hardware platforms. By contrast, a compiled module is already in binary form. As such, compiling is not necessary, making the binary code portable between platforms.

Referring back to FIG. 3, in process 19, virtual PCI module 27 identifies (36) GVNIC 22 to the guest operating system. As noted above, virtual PCI module 27 may provide GVNIC 22 with identifiers or the like that correspond to GVNIC 22. The guest operating system running in VM 17 uses the identifiers to program (38) GVNIC 22 to run with the guest operating system, as described above.

The system 10 described herein has numerous advantages. For example, it separates generic VNIC functionality from functionality that is VM-specific. System 10 thus reduces development time by requiring developers to write code only for VM-specific functions. System 10 also allows the GVNIC to be configured without re-compiling the VMM, making it possible for the GVNIC and the VMM to be provided by different vendors. System 10 allows dynamic loading and unloading of VNIC modules and allows VNIC modules to reside outside of the VMM. System 10 supports different types of virtual PCI devices and different types of VMs. More than one VM may be interfaced to GVNIC 22.

Figure 2:
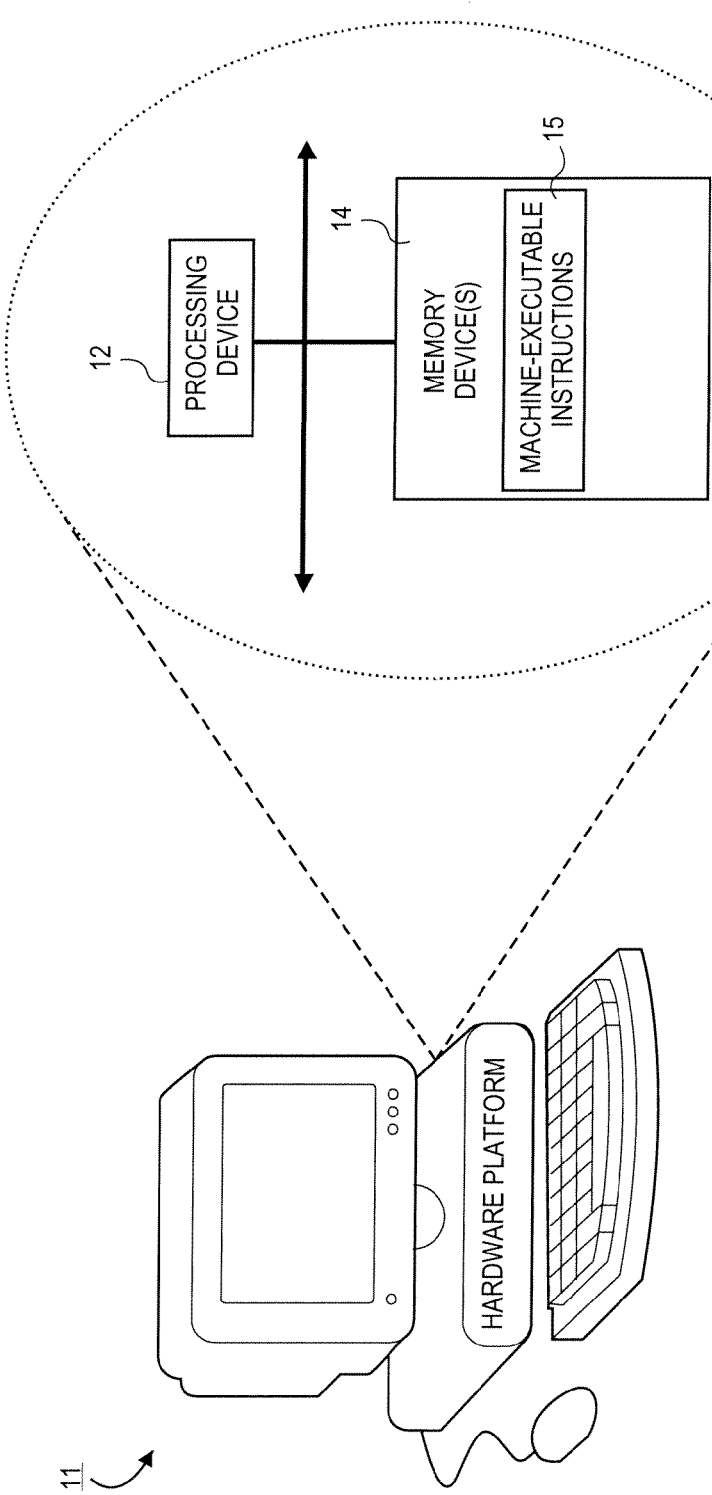
FIG. 2 is an example of a computer on which the system of FIG. 1 and the process of FIG. 3 may be implemented.

System 10 is not limited to use with the hardware and software of FIGS. 1 to 3; it may find applicability in any computing or processing environment System 10 may be implemented in digital electronic circuitry, or in computer hardware, firmware, software, or in combinations of them. System 10 may be implemented as a computer program product or other article of manufacture, e.g., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

System 10 can be implemented via one or more programmable processors executing a computer program to perform functions. System 10 can also be implemented by, and apparatus of system 10 can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of non-volatile memory, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

System 10 can be implemented in a computing system that includes a back-end component, e.g., as a data server, or that includes a middleware component, e.g., an application server, or that includes a front-end component, e.g., a client computer having a graphical user interface or a Web browser through which a system administrator can interact with the management modules, or any combination of such back-end, middleware, or front-end components.

The components of system 10 can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

System 10 is not limited to the specific embodiments described herein. For example, system 10 is not limited to the specific processing order of FIG. 3. Rather, the blocks of FIG. 3 may be re-ordered and/or omitted, as desired, to achieve the results set forth above.

Other embodiments not described herein are also within the scope of the following claims.

What is claimed is:

1. A method comprising:
   running a virtual machine; and
   configuring a virtual network interface card to route data packets between the virtual machine and a hardware device;

wherein the virtual network interface card is configured without re-compiling a virtual machine monitor containing the virtual network interface card, and wherein configuring the virtual network interface card comprises:
  dynamically loading, into the virtual network interface card, a module that is external to the virtual machine monitor containing the virtual network interface card, the module being a compiled module and comprising data to configure the virtual network interface card to work with the virtual machine;
  configuring the virtual network interface card in accordance with the data from the module, the virtual network interface card being configured to implement direct memory accesses that are implemented by an actual network interface card that is emulated by the virtual network interface card when configured; and
  configuring data structures for use in transmitting data packets between the virtual machine and the hardware device.

2. The method of claim 1, wherein configuring relates to specifying at least one of a memory access process and content for configuration registers for the hardware.

3. The method of claim 1, wherein the module comprises a binary module.

4. The method of claim 1, wherein the virtual machine and the virtual network interface card are run on a processor of a device, the device including a network interface card that comprises the hardware device.

5. The method of claim 1, wherein configuring comprises configuring access to memory modules.

6. The method of claim 1, wherein the virtual network interface card implements functionality that is common to different types of virtual machines.

7. The method of claim 1, wherein the virtual network interface card comprises tasks for supporting drivers on the hardware device and on a virtual machine, the tasks comprising tasks: to claim a region in a configuration space to allow an operating system to access a peripheral component interconnect (PCI) header of the virtual network interface card, to claim a region in memory and/or input/output (I/O) space to allow a driver to access control and status registers of the virtual network interface card; to inject interrupts into a virtual machine; to transmit and to receive data packets; and to handle callbacks.

8. A system comprising:
  an interface device to execute a driver; and
  a processor; instructions, when executed by the processor implement:
    a virtual machine; and
    a virtual network interface card that is configurable without re-compiling a virtual machine monitor containing the virtual network interface card in order to enable communication between the driver and the virtual machine;
  wherein the processing device is configured to execute instructions to configure the virtual network interface, the instructions for causing the processing device to:
    dynamically loading, into the virtual network interface card, a module that is external to the virtual machine monitor containing the virtual network interface, the module being a compiled module and comprising data to configure the virtual network interface card to work with the virtual machine;
    configure the virtual network interface card in accordance with the data from the module, the virtual network interface card being configured to implement direct memory accesses that are implemented by an actual network interface card that is emulated by the virtual network interface card when configured; and
    configure data structures for use in transmitting data packets between the virtual machine and the hardware device.

9. The system of claim 8, wherein configuring relates to specifying at least one of a memory access process and content for configuration registers for the hardware.

10. The system of claim 8, wherein the module comprises a binary module.

11. The system of claim 8, wherein the processor is configured to execute instructions to implement:
  a space module to route memory accesses from the virtual machine to the virtual network interface card;
  a programmable interrupt control module to send interrupts to the virtual machine; and
  a peripheral component interconnect module to discover the virtual network interface card and to initiate configuration of the virtual network interface card.

12. The system of claim 8, wherein the processor is configured to execute instructions to configure access to memory modules.

13. The system of claim 8, wherein the virtual network interface card implements functionality that is common to different types of virtual machines.

14. The system of claim 8, wherein the virtual network interface card comprises tasks for supporting drivers on the hardware device and on a virtual machine, the tasks comprising tasks: to claim a region in a configuration space to allow an operating system to access a peripheral component interconnect (PCI header of the virtual network interface card, to claim a region in memory and/or input/output (I/O) space to allow a driver to access control and status registers of the virtual network interface card; to inject interrupts into a virtual machine; to transmit and to receive data packets; and to handle callbacks.

15. An article comprising a machine-readable storage medium that stores instructions that cause a machine to:
  run a virtual machine; and
  configure a virtual network interface card, without re-compiling a virtual machine monitor containing the virtual network interface, to route data packets between the virtual machine and a hardware device;
  wherein configuring the virtual network interface card comprises:
    dynamically loading, into the virtual network interface card, a module that is external to the virtual machine monitor containing the virtual network interface, the module being a compiled module and comprising data to configure the virtual network interface card to work with the virtual machine;
    configuring the virtual network interface card in accordance with the data from the module, the virtual network interface card being configured to implement direct memory accesses that are implemented by an actual network interface card that is emulated by the virtual network interface card when configured; and
    configuring data structures for use in transmitting data packets between the virtual machine and the hardware device.

16. The article of claim 15, wherein configuring relates to specifying at least one of a memory access process and content for configuration registers.

17. The article of claim 15, wherein the module comprises a binary module.

18. The article of claim 15, wherein configuring comprises configuring access to memory modules.

19. The article of claim 15, wherein the virtual network interface card implements functionality that is common to different types of virtual machines.

20. The article of claim 15, wherein the virtual network interface card comprises tasks for supporting drivers on the hardware device and on a virtual machine, the tasks comprising tasks: to claim a region in a configuration space to allow an operating system to access a peripheral component interconnect (PCI) header of the virtual network interface card, to claim a region in memory and/or input/output (I/O) space to allow a driver to access control and status registers of the virtual network interface card; to inject interrupts into a virtual machine; to transmit and to receive data packets; and to handle callbacks.

* * * * *